Jan. 26, 1926.

E. VOLLRATH 1,570,801

BELT CLAMP

Filed Nov. 6, 1924

INVENTOR
Edwin Vollrath
BY Hervey Barber & McKee
ATTORNEY

Patented Jan. 26, 1926.

1,570,801

UNITED STATES PATENT OFFICE.

EDWIN VOLLRATH, OF EASTON, PENNSYLVANIA, ASSIGNOR TO VICTOR BALATA & TEXTILE BELTING CO., OF NEW YORK, N. Y., A CORPORATION OF PENNSYLVANIA.

BELT CLAMP.

Application filed November 6, 1924. Serial No. 748,122.

*To all whom it may concern:*

Be it known that I, EDWIN VOLLRATH, a citizen of the United States, residing at the city of Easton, county of Northampton, State of Pennsylvania, have invented new and useful Improvements in a Belt Clamp, of which the following is a specification.

This invention relates to improvements in belt clamps and is especially well adapted for use on textile fabric belts such as canvas stitched, solid woven cotton, camel's hair or rubber belts. It can be used to great advantage on the type of belts in use in the oil fields where the belts are subjected to all kinds of weather and hard usage under an exceptionally heavy strain which is liable to materially lessen the life of the belts.

Heretofore the custom has been to employ as a clamp merely two flat bars of steel or iron with square edges, between which the belt ends are held by means of bolts inserted through apertures in the said bars and the two belt thicknesses. This has been found expensive and unsatisfactory as the square edges of the bars cut the belt fabric and there is a tendency for the ends to tear out around the apertures through which the bolts pass.

In my device these difficulties are overcome by the use of curved flanges instead of square edges together with corrugations of any desired form on the inner faces of the clamp bars which serve to provide a greatly increased grip across the surfaces of the belt ends.

Other advantages are described in the following specification and illustrated in the drawings in which:—

Figure 1:
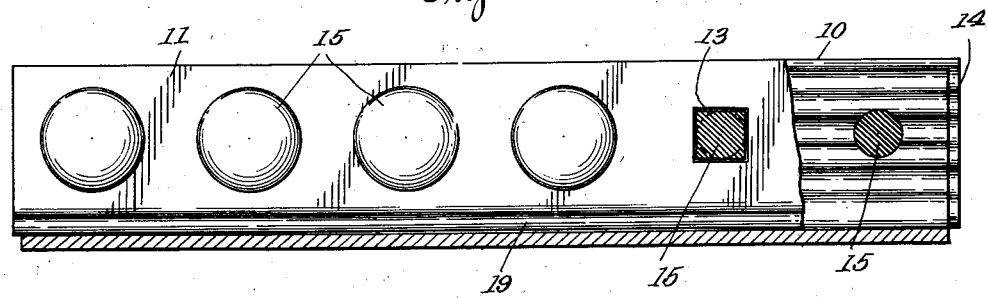
Fig. 1 is a side view of the clamp with parts broken away.
Figure 2:
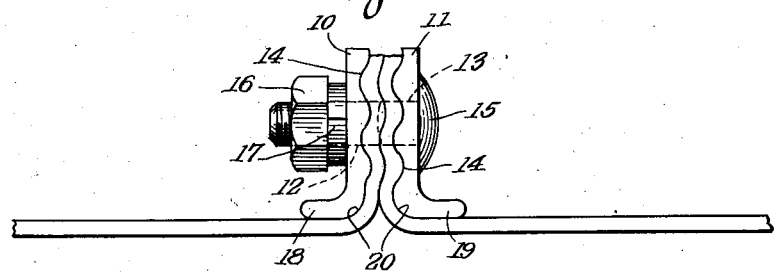
Fig. 2 is an end view.
Figure 3:
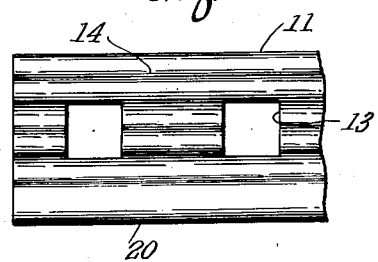
Fig. 3 is a fragmentary detail view of one of the clamping members.

My device comprises the two clamp members 10 and 11, in which are the apertures 12 and 13 respectively. On the inner faces of the two members 10 and 11, corrugations 14 are provided so that the clamped ends of the belt B are gripped and locked in the waved formation thus obtained.

To lock the clamp members 10 and 11 firmly together with the belt ends positioned between, the bolts 15 with nuts 16 and lock washers 17 are provided, the threaded ends of the said bolts 15 passing through apertures in the said belt ends. The lower ends of the clamp members 10 and 11 consist of the outwardly turned flanges 18 and 19 with rounded inner faces 20—20 against which the curved surfaces of the belt B are positioned.

As is obvious from the above, there are no sharp edges to injure or destroy the material of the belt, and the strain and wear around the apertures in the belt are materially lessened by the gripping of the belt ends between the corrugations on the inner faces of the clamping members 10 and 11.

I claim:—

In a belt clamp the combination of the following elements; rigid clamping members provided with corrugated inner faces and outwardly extending rectangular flanges having curved inner faces; and means adapted to lock belt ends and the clamping members together comprising bolts adapted to be passed through apertures in the said belt ends and in the said clamping members, lock washers on the said bolts, and nuts adapted to hold the said lock washers in close engagement with the said clamping members.

EDWIN VOLLRATH.